Aug. 10, 1943.　　　B. M. IKERT　　　2,326,652
APPARATUS FOR DETERMINING FLUID PRESSURE
Filed Dec. 4, 1939
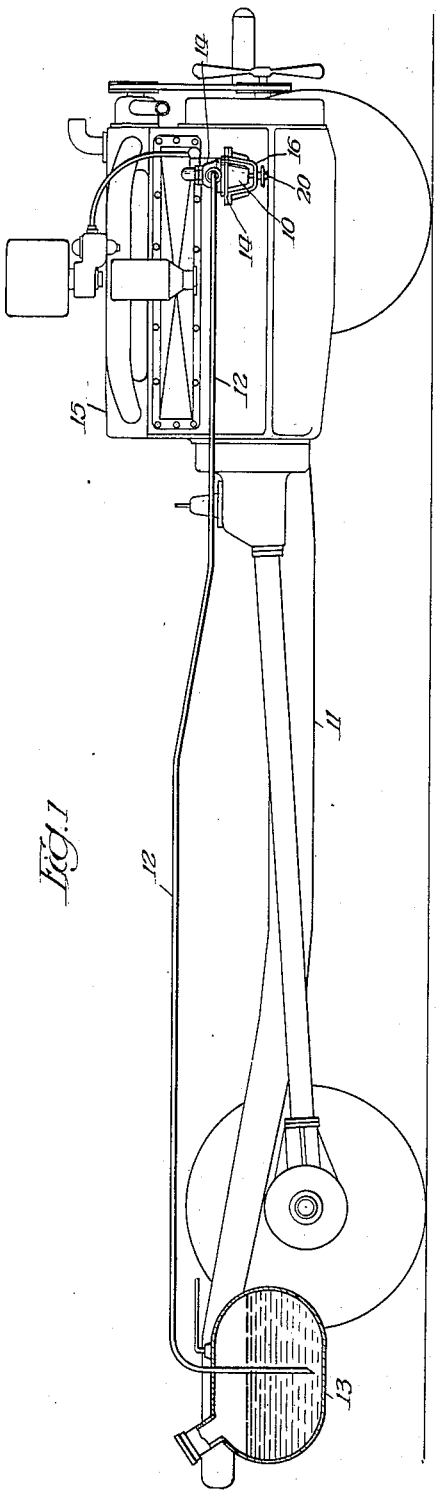
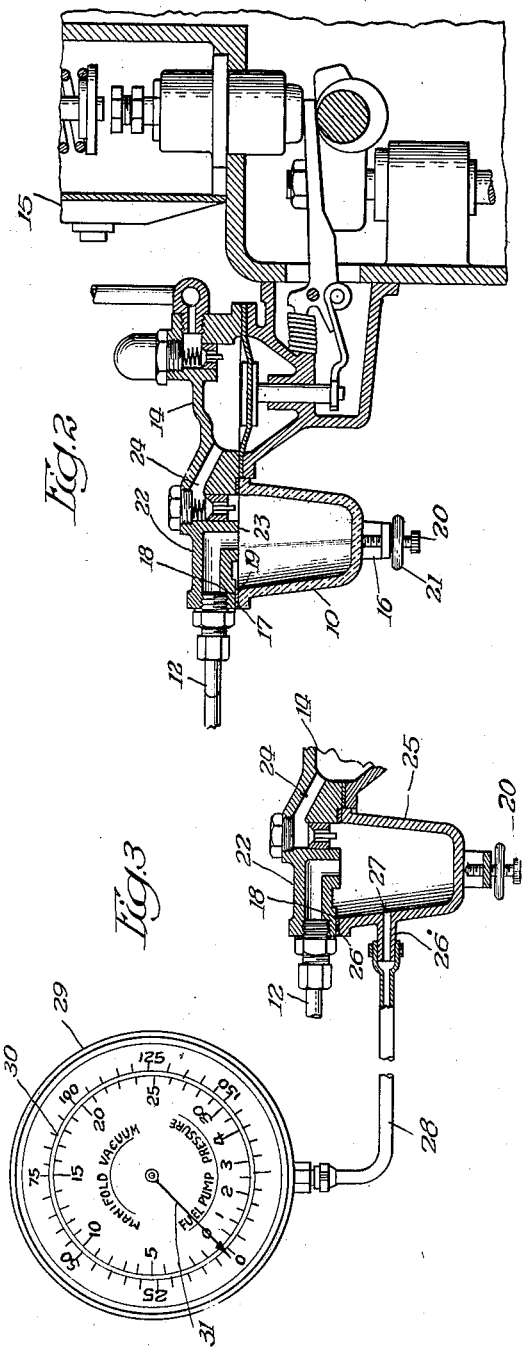
Inventor
BRUNO M. IKERT
By John A. Marzall
Atty Patented Aug. 10, 1943

2,326,652

UNITED STATES PATENT OFFICE 2,326,652

APPARATUS FOR DETERMINING FLUID PRESSURE

Bruno M. Ikert, Elgin, Ill., assignor to Warner-Patterson Company, Chicago, Ill., a corporation of Illinois Application December 4, 1939, Serial No. 307,436

1 Claim. (Cl. 73—31)

This invention relates to an apparatus for determining fluid pressure and its primary object is the provision of new and simple means adapted for application to a part of an automobile for determining quickly and easily the pressure in the gasoline feed line of an automobile.

A further object of the invention is the provision of a removable disconnectable element in the form of a cup or vessel which is adapted to be applied interchangeably for the sediment bowl or cup in a gasoline line, the said cup or vessel being adapted to be removably supported in position on the gasoline motor or housing that the gasoline strainer occupies, there being a provision for the attachment to the vessel or cup of a pressure gauge so that the pressure required to draw the gasoline from the tank to the pump will be measured.

A still further object of the invention is the provision of new and novel means which is adapted to be applied to a part of an automobile in a position forwardly of the point where the gasoline line passes through the pump to the carbureter so as to determine by relative pressure whether or not there exists a clog in the gasoline feed line.

Numerous other objects and advantages will be apparent throughout the progress of the following specification.

The accompanying drawing illustrates a selected embodiment of the invention and the views therein are as follows:

Fig. 1 is a detail elevational view partly in section of an automobile chassis and motor to which the invention is applied.

Fig. 2 is a detail sectional view of part of an automobile motor showing specifically a gasoline feed line leading to a sediment cup and a pump or suction means for drawing the gasoline from the said cup.

Fig. 3 is a detail sectional view showing the invention applied in position.

The apparatus for determining the fluid pressure in the feed line from the gasoline tank to the gasoline motor is adapted to include an element in the form of a cup or other vessel for replacing the conventional cup 10 now employed on innumerable combustion motors.

In devices which are propelled by an internal combustion motor such as an automobile 11 which is shown herein for the purpose of illustrating the invention, there exists a gasoline line 12 which runs from the gasoline tank or other source of supply 13 to the gasoline pump 14, the pump 14 draws the gasoline from the tank 13 through the gas pipe line 12 and forces it through the carbureter where in turn it is fed or carburetted to the engine 15. It has been found desirable to place the cup 10 at a point ahead of the gasoline pump 14 so that any sediment which may be in the gasoline will be deposited in the cup 10.

The cups 10 are generally made of glass so that it can be seen readily whether or not there is sediment deposited and if so the cup can be cleaned quickly. The cup 10 is therefore made detachable and one form of fastening means for detachably securing the cup in position comprises a U-shaped strap 16 which extends across the sides and underneath the cup. The upper edge of the cup 10 is smooth and flat as indicated at 17 and seats against a cooperating surface 18 which may be a part of the gasoline pump or another part of the motor to which the pump is attached. A gasket 19 may be inserted between the upper rim 17 of the cup and its co-operating surface 18 so as to insure a fluid tight connection. The cup 10 is locked tightly in position by means of a set screw 20 which passes through the metal strap 16 and engages the bottom of the cup so that when the screw 20 is screwed inwardly, it will press the seats 17 and 18 tightly together. If desired, a lock nut 21, may be provided to lock the cup in its normal operating position.

The line 12 from the tank 13 has a fitting 22 in the form of a nozzle 23 which discharges into the cup 10. This cup is normally full of gasoline which is drawn from the cup 10 through the passage 24 which leads to the pump 14. The pump 14 therefore draws the gasoline from the tank 13 into the cup 10 and then out of the cup 10 into the carbureter. Any sediment which may be in the gasoline will become deposited on the bottom of the cup 10 and is prevented from passing into the carbureter.

In testing internal combustion engines it is extremely difficult to determine whether the gasoline feed line is functioning properly and very often the owner is put to the expense of blowing out the feed lines when in fact the feed lines are clean.

The invention therefore contemplates the provision of means for easily and quickly testing feed lines to determine whether or not they are clogged. The means for determining whether or not there exists any clog in the line comprises a cup 25 which is preferably made of metal and which is adapted to be constructed in exact accordance with the dimensions of the cup 10 so that during the testing operation it can be applied in place of the cup 10. The cup 25, therefore, is substantially the same size and shape as the cup 10 and is provided with a bearing surface 26 which is adapted to bear against the surface 18 on the fitting 22. The screw 20 is adapted to be operated for locking the cup or vessel 25 in place. This cup or vessel 25 is adapted to be made of metal or other material which is durable and not likely to break during handling. The cup 25 is provided with a nipple 26′ extending from a side thereof, there being a passage 27 in the nipple communicating with the interior of the cup 25. A flexible pipe line such as a rubber tube 28 is adapted to be fastened about the nipple 26 and leads to a gauge or other indicator 29 so as to determine the vacuum or pressure in the cup 25. The indicator 29 is provided with a graduated scale 30, the scale designating millimeters of mercury so that the vacuum in the cup can be determined readily and instantly. The gauge 29 is provided with a pointer or other indicating means 31 which is adapted to be moved in a clockwise direction depending on the amount of vacuum existing in the cup 25. The pointer or indicator 31 may be operated by any conventional means such as by a Bourdon tube which is adapted to coil and uncoil depending on the amount of pressure or vacuum. The Bourdon tube, therefore, controls the operation of the indicating hand 31. Therefore, as the indicator hand 31 moves to a predetermined position, it is known whether or not there is a clog in the line because the amount of pressure required to draw the gasoline from the tank to the cup is considerably more than is usually required. Therefore, it is indicated definitely that there is a clog or other obstruction in the feed line 12.

The invention comprises a gauge provided with graduations indicative of certain millimeters of mercury pressure or vacuum with an indicating hand adapted to be moved by pressure or vacuum so that the amount of vacuum or pressure may be read. The gauge 29 is adapted to have connected thereto a tube or pipe 28 which is disconnectedly fastened to the nipple 26. The nipple 26 is preferably formed as an integral part of the cup 25, the cup 25 being adapted to temporarily replace the cup 10 during the test of the feed line.

To test the feed line in order to determine whether or not the feed line is clogged, the set screw 20 is sufficiently loosened so that the cup 10 may be removed. The cup 25 is then placed in the position where the cup 10 was applied and the set screw is tightened to lock the cup 25 in position. The tube 28 is then fastened to the nipple and to the gauge 29 and the motor is started. The pressure or suction in the line 12 will be the same in the line 28. Therefore, if the pointer 31 moves to a position beyond that which it should normally occupy when the suction in the line is normal, it is indicated definitely that greater suction is required to suck the gasoline from the tank 13 than is needed under normal conditions. It is therefore indicated that there is an obstruction in the line 12.

The cup 10 may be quickly and instantly removed and the cup 25 may be quickly and instantly replaced for the cup 10. Therefore, whether or not there exists an obstruction in the line 12 can be determined readily and instantly.

The invention provides small, compact, efficiently operated mechanism including an element which may be substituted temporarily for a normal operating part of the structure.

Changes may be made in the form, construction and arrangement of the parts without departing from the spirit of the invention or sacrificing any of its advantages, and the right is hereby reserved to make all such changes as fairly fall within the scope of the following claim.

The invention is hereby claimed:

In testing apparatus for determining if there is a clog in the fuel line of an internal combustion engine having a fuel pump and a sediment cup removably fastened to a fixture connected in the fuel line by connecting a pressure gauge to the fuel line adjacent the fuel pump, means for connecting said gauge to said fuel line comprising a cup-shaped receptacle constructed to be substituted for said sediment cup, means on said receptacle adapted to cooperate with means on said fixture detachably to connect said receptacle to said fixture in place of said sediment cup, a wall of said cup-shaped receptacle having an opening communicating with the interior of the receptacle, and a pressure gauge communicating with the opening in said receptacle, whereby the fuel line may be tested while it is intact.

BRUNO M. IKERT